Aug. 27, 1935. G. F. BAHR 2,012,921
SPLASH GUARD FOR VEHICLE WHEEL FENDERS
Filed March 29, 1933
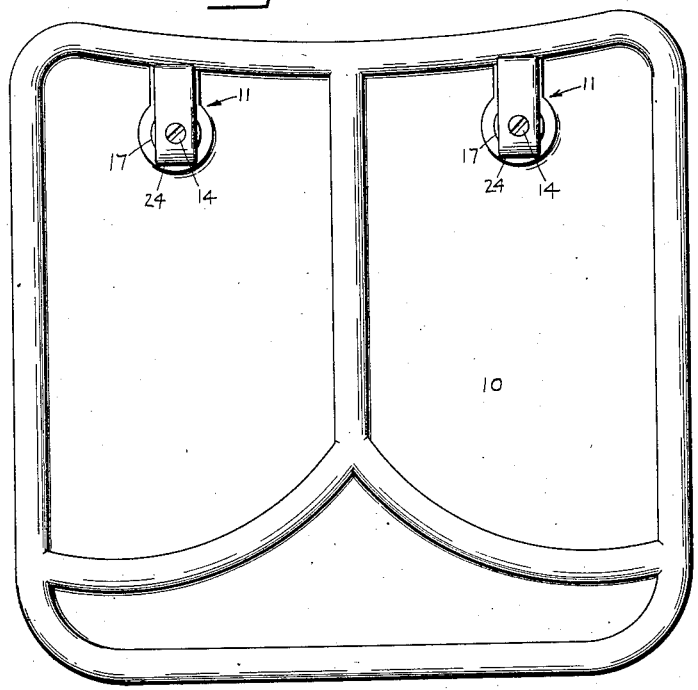
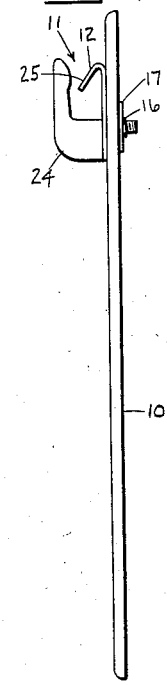
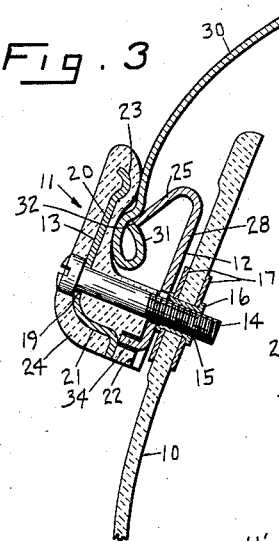
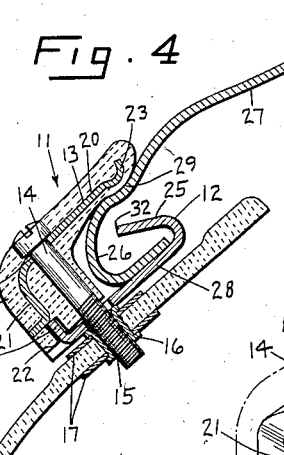
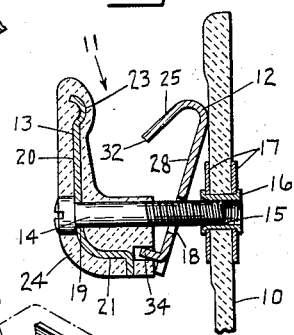
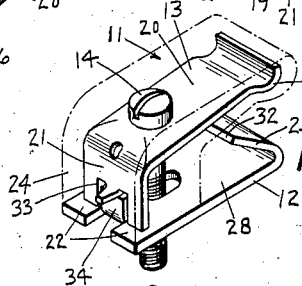
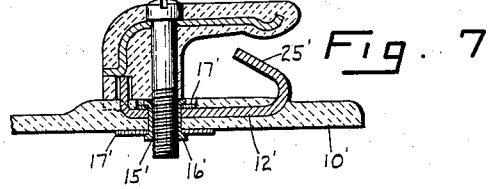
INVENTOR
Gustave F. Bahr
BY
ATTORNEY Patented Aug. 27, 1935

2,012,921

UNITED STATES PATENT OFFICE 2,012,921

SPLASH GUARD FOR VEHICLE WHEEL FENDERS

Gustave F. Bahr, Fairfield, Conn., assignor to Joseph H. Cohen, Bridgeport, Conn.

Application March 29, 1933, Serial No. 663,399

13 Claims. (Cl. 280—152)

This invention relates to splash guards for the fenders of motor vehicles, and more particularly, to advantageous means for attaching such guards in operative position.

Various automobile manufacturers provide very diversified forms of fenders in order to enhance the appearance and to have their cars look different from others; some with large beads and others with small beads, and some with a full return bend on the bead and others with only a partial return bend on the bead. These differences have been so marked in many instances that the attaching means on most of the splash guards furnished to the trade now are not universally applicable.

It is a particular object of the present invention to provide attaching means which will be more universal than most of those forms heretofore presented and which may be applied to a variety of cars even though the fender details are markedly different.

It is another object of the present invention to provide a splash guard which will remain associated with the fender even though the attaching means loosens considerably, and which is, therefore, less apt to drop off and become lost.

It is a further object of the present invention to provide a splash guard with attaching means with jaws which may be opened very wide, while still associated with the apron section of the guard, in order to be connected to those fenders having a very large diameter bead.

A feature of the invention is the provision of a splash guard having a clamp made of two jaws so arranged as to prevent relative turning between the two, thereby facilitating assembly of the splash guard to an automobile fender.

Another feature is the provision of novel attaching means for a splash guard including a jaw having a base section adapted to engage and hold large beads and having an integral nose piece adapted to grip fenders having a small bead, with the end of the nose piece adapted to hook onto or into both large and small beads to prevent inadvertent loss of the splash guard.

Other features and advantages will hereinafter appear.

In the drawing—

Figure 1 is a top plan view of the present preferred form of splash guard made in accordance with the present invention.

Fig. 2 is a side view of the splash guard shown in Fig. 1.

Fig. 3 is a longitudinal sectional view of the attaching means provided by the present invention applied to one type of fender.

Fig. 4 is a longitudinal sectional view similar to Fig. 3, but shows the attaching means applied to a very different type of fender.

Fig. 5 is a longitudinal sectional view of the attaching means in the open position, ready for attachment to a fender.

Fig. 6 is a perspective view of the attaching means.

Fig. 7 is a longitudinal sectional view of a modified form of attaching means.

The splash guard of the present invention comprises an apron 10, which may be made of leather, fabricoid or the like, but which, for economy, is preferably made of soft molded rubber and is made of sufficient weight so that it hangs down and intercepts dirt, oil and the like from being thrown onto the car body by the wheel during travel.

According to the present invention, there is provided a novel form of clamping or attaching means 11 for securing the apron 10 to the fender of a car. This attaching means, in its present preferred form, comprises a metal clamping jaw 12 adapted to engage the inside of a fender and a complementary outside clamping jaw 13, which is preferably covered with soft molded rubber or other material, having the characteristic of not scratching or marring the finish of an automobile. These two clamping jaws 12 and 13 are preferably made as physically separate parts in order to provide a maximum of spread and thereby facilitate connection to a fender on a car. A screw 14, preferably having a threaded connection 15 with a sleeve 16 on the apron, is provided to clamp the jaws together for securement of the apron to a fender or the like. The clamping jaws are rotatably mounted on the screw 14 so that they may be made to assume different arcuate positions relative to the screw and longitudinal positions relative to the apron in order to better fit various convex contours at the ends of the fenders on a large variety of cars.

Connection of the screw 14 with the apron 10 is preferably accomplished through the provision of a threaded sleeve 16 located in a suitable aperture in the apron and headed over on washers 17 at opposite sides of the apron so that it will remain rigidly secured thereto. It is also possible, for economy, to merely use a loose washer and nut (not shown) on the back of the apron; however, this plan is less satisfactory than the one shown. The jaws 12 and 13 of the attaching means 11 are rigidly clamped together and secured to the apron by passing the screw 14 through apertures 18 and 19 on the inside and outside jaws 12 and 13 respectively, and then tightening it with a screw driver.

By having the attaching means 11 made of two separate parts in this manner and mounted on a screw 14, it is possible to have the two clamping jaws open up a considerable extent, as shown in Fig. 5, so that the splash guard may be added to a large variety of cars without the necessity of drilling holes or making other costly and slow arrangements.

The outside jaw 13 is preferably made substantially L-shaped with a back portion 20 adapted to engage the outer face of a fender during the clamping function, and having at its lower end and at a right angle thereto a base portion 21 adapted to engage an inside face 22 of the inside jaw for the purpose of spacing the back portion 20 of the outside jaw from the inside jaw and thus serve as a fulcrum about which the outer jaw is moved when the screw is tightened. The outside jaw is also preferably provided with a rib 23 adapted to fit into grooves on the outside surface of a fender and thereby further tend to prevent the splash guard from slipping off a fender. Although not essential, it is preferably enclosed in a covering 24 of soft rubber or other similar matter, as by molding, so that it will not mar the outside finish of a fender or other part of the car upon which it is secured.

The inside jaw 12 of the attaching means 11 is preferably made entirely of metal, for there is no particular danger of marring the finish of an automobile. It should be particularly noted that this jaw is provided with a nose piece 25, in the form of a return bend, at its outer end which is left substantially open and which is adapted to hook into a large open bead, such as the bead 26 on the fender 27 shown in Fig. 4, to locate and support the splash guard on such a fender during the initial application and thereby free both hands of an assembler while the screw 14 is being tightened to hold the splash guard in place. It also serves the additional important function of supporting the splash guard on the fender should the screw 14 become loosened inadvertently through vibration and the like, and thereby prevents the loss of the complete splash guard which might otherwise occur.

When the splash guard is so applied, a base portion 28 of the jaw 12 serves to clamp the fender, for as the screw 14 is tightened it draws the outside jaw 13 against the outside face of the fender, with the rib 23 in a groove 29 of the fender 27 and draws the base portion 28 of the inside jaw 12 against the bead 26 rigidly while the nose piece 25 remains hooked in the bead.

The splash guard and attaching means 11 provided by the present invention may also be quickly and advantageously applied to a fender 30 with a small bead 31 having a full return bend, as shown in Fig. 3. In such an application, the outer face of the nose piece 25 engages with the inside face of the fender while the tip 32 of the nose piece rests upon the bead 31, and in this position the screw 14 is tightened and the outside jaw is moved toward the inside jaw with the screw 14 to rigidly clamp the fender 30 between the nose piece 25 of the inside jaw and the back portion 20 of the outside jaw 13. If the bead 31 is not provided with a full return bend, the tip 32 of the nose piece 25 may be dropped within the bead a short extent after which the two jaws 12 and 13 of the attaching means may be moved together.

Thus, the present invention provides a novel small attaching means which, in effect, has a double clamping range and which, without special preparation, advantageously clamps a splash guard to a fender with a small bead or to fenders with large beads.

With that type of fender shown in Fig. 4, there is considerable inherent springiness of the open bead 26 between the clamping jaws 12 and 13 which would naturally tend to allow the attaching means to loosen and permit the splash guard to inadvertently drop off the fender, however, the nose piece 25, which hooks inside the bead, prevents such inadvertent loss and keeps the splash guard on the fender until the operator happens to notice that such a loosening of the attaching means has occurred and takes the necessary steps to again tighten it properly in place.

A novel structural arrangement is provided by the present invention to prevent relative rotation between the inside jaw 12 and outside jaw 13 about the holding screw 14, and to this end the outside jaw is provided with a slot 33 and the inside jaw is provided with a tongue 34 having a free sliding fit in the slot. This construction obviates the necessity for aligning one clamping jaw relative to the other at the time of putting a splash guard on the fender of a car and thereby considerably facilitates this assembly. At the same time it makes possible rotation of the complete attaching means for alignment with the various contours of the bead section on the fenders by merely grasping and turning one of the clamping jaws; for example, the outside jaw 13. This tongue and slot connection, although capable of preventing relative rotation between the inside and outside jaws 12 and 13, is, through the elongated slot 18, such that it permits relative longitudinal movement between these two parts, which is an advantage in those fenders where it may be desirable to have a shorter or longer spacing of the nose piece on the inside jaw relative to the notch 23 on the outside jaw 13. If preferred, the tongue 34 may be provided on the outside jaw 13 and the slot may be provided on the inside jaw 12; however, for manufacturing reasons, the arrangement shown is at present preferred. In Fig. 7 there is shown a modified form of the invention comprising a clamping jaw 12' which is molded solidly in place with the rubber apron 10' and is with a movable jaw 11' adapted to clamp the apron to fenders like the preferred form of clamp hereinbefore described in detail. A threaded connection 15' comprising a threaded sleeve 16' and washers 17' may be added to the apron 10' and clamp 12' after the molding operation. The main advantages of this form of invention over the preferred form already described in detail are that the rubber apron lying underneath the hook 25' is adapted to engage the bead of the fender and prevent scratching to a greater degree, and during the manufacturing operations there is less danger of losing the inside clamping jaw.

Other variations and modifications may be made within the scope of this invention and portions of the improvements may be used without others.

Having thus described the invention, what is claimed as new and for which it is desired to obtain Letters Patent, is:—

1. A splash guard for a vehicle wheel comprising an apron; a naked metal jaw having an open return bend adapted to hook into an open bead on the underside of a fender; a cushion metal jaw adapted to engage the outside of the fender; and a screw for securing said jaws together and to the apron.

2. A splash guard for a vehicle wheel comprising an apron; a rubber covered clamping jaw adapted to engage the outside face of a vehicle wheel fender, forming one half of a clamp; a naked metal jaw forming the other half of the clamp having an integral base section and nose section adapted to engage with different sections respectively on the inside of the fender; and screw means adapted to pass through said rubber covered jaw and metal jaw for securing said jaws together and upon the apron.

3. A splash guard for a vehicle wheel comprising an apron; a clamp for attaching said apron to a vehicle wheel fender comprising clamping jaws with a screw passing therethrough and into the apron for securing said clamping jaws together and to the apron; and a tongue and slot construction on said clamping jaws adapted to prevent relative turning.

4. A splash guard for a vehicle wheel comprising an apron; a clamp for attaching said apron to a vehicle wheel fender comprising clamping jaws with a screw passing therethrough and into the apron for securing said clamping jaws together and to the apron; a tongue and slot construction on said clamping jaws adapted to prevent relative turning; and means to permit longitudinal movement of one clamping jaw relative to the other while preventing relative rotation.

5. A splash guard for a vehicle wheel comprising an apron; a clamp for attaching said apron to a vehicle wheel fender comprising a pair of clamping jaws and a screw passing therethrough and into the apron for securing said clamping jaws together and to the apron; and means connecting the jaws independently of said screw permitting limited longitudinal movement while preventing relative rotation between the clamping jaws about the axis of said screw.

6. A splash guard for a vehicle wheel comprising an apron; a jaw adapted to engage the inside face of a fender and having a substantially flat main portion; a substantially L-shaped jaw having a vertical leg adapted to engage the outer face of the fender and having an integral horizontal leg adapted to space the vertical leg from the first-named jaw and in substantially parallel relation thereto, said shorter leg engaging the first-named jaw to form a fulcrum for the L-shaped jaw, said jaws forming together a substantially U-shaped clamp; and a screw passing through said jaws above and substantially parallel with the horizontal leg of the L-shaped jaw and having a threaded connection with the apron for securing a fender between the jaws and for securing the jaws to the apron.

7. A splash guard for a vehicle wheel comprising an apron; an inside jaw; a substantially L-shaped outside jaw having a vertical section adapted to engage the outer face of a fender and having an integral base section adapted to space the vertical section from the first-named jaw and engaging the latter to form a fulcrum thereon for said outside jaw; a base section on the inside jaw adapted to engage the bead of a fender; a nose piece on said inside jaw, in the form of an open return bend, adapted to hook into an open bead of a fender; and a screw passing through said jaws and the apron for securing a fender between the outside jaw and the base of the inside jaw while the nose piece is hooked into the bead, and for securing said jaws to said apron.

8. A splash guard for a vehicle wheel comprising an apron; an inside jaw; a substantially L-shaped outside jaw having a vertical section adapted to engage the outer face of a fender and having an integral base section adapted to space the vertical section from the first-named jaw and engaging the latter to form a fulcrum thereon for said vertical section; a base section on the inside jaw which, with the outside jaw, forms a pair of articulated jaws for clamping the splash guard to a fender; a nose piece on the inside jaw adapted to hook into the bead of a fender and to engage the inside face of a fender and thereby form a supplementary clamping jaw with the base section and the outside jaw to clamp the apron to a fender; and screw means for moving the nose piece and base section of the inside jaw toward the outside jaw so as to clamp a fender therebetween and for securing said jaws to said apron.

9. A splash guard for automobiles comprising an apron; an attaching clamp for securing said apron to a fender or the like, including an inside jaw and an outside jaw; a screw for effecting relative movement between the jaws; and a tongue and slot connection between said jaws acting with said screw to restrict relative turning movements between the two jaws.

10. A splash guard for automobiles comprising an apron; a pair of cooperating physically separate jaws for securing said apron to a fender; screw means for effecting relative movement between said jaws and for connecting the jaws to the apron, and about which said jaws may be rotated in order to align with different convex fender rims; and a tongue and slot connection between said pair of jaws for effecting conjoint rotation of both jaws about the screw means although but one jaw is manually moved.

11. A splash guard for automobiles comprising an apron; a pair of cooperating physically separate jaws for securing said apron to a fender; screw means for effecting relative movement between said jaws and for connecting the jaws to the apron, and about which said jaws may be rotated and align with different contours of fender rims; and means for effecting conjoint rotation of the cooperating physically separate jaws about the screw means although but one jaw is manually moved.

12. A splash guard for automobiles comprising an apron; a clamping jaw having at least a substantial portion thereof embedded in said apron and having a nose piece adapted to overlie the bead and engage the inside face of a fender; a cooperating movable clamping jaw fulcrumed on said first-named jaw and adapted to engage the outside face of a fender; and screw means for securing the fender between the outside jaw and the first-named jaw and for securing said jaws to said apron.

13. A splash guard for automobiles comprising an inside jaw; an outside jaw; and a draft member for pulling said jaws together and against the lower edge of a fender to secure the guard thereto, said jaws being substantially rigid and being fulcrumed one on the other, and at least one of said jaws having a cushion-like covering whereby the draft member is held under tension by said cushion when tightly drawing the jaws against the fender.

GUSTAVE F. BAHR.